United States Patent
Atkins

(12) 
(10) Patent No.: US 6,463,691 B1
(45) Date of Patent: Oct. 15, 2002

(54) MAGNETICALLY ACTUATED INDICATOR DEVICE FOR A FISHING ROD, FISHING RIG INCORPORATING THE DEVICE, AND METHOD OF USING SAME

(76) Inventor: Michael R. Atkins, 4255 Nagle Hwy., Rogers City, MI (US) 49779

( * ) Notice: Subject to any disclaimer, the term of this patent is extended or adjusted under 35 U.S.C. 154(b) by 0 days.

(21) Appl. No.: 09/372,540

(22) Filed: Aug. 11, 1999

Related U.S. Application Data

(60) Provisional application No. 60/097,149, filed on Aug. 19, 1998.

(51) Int. Cl.[7] ............................................. A01K 97/12
(52) U.S. Cl. ......................................................... 43/17
(58) Field of Search ........................ 43/16, 17; 340/984, 340/686, 547, 551, 573.1

(56) References Cited

U.S. PATENT DOCUMENTS

| | | | | |
|---|---|---|---|---|
| 1,132,158 A | * | 3/1915 | Brewer et al. | 43/17 |
| 1,406,038 A | * | 2/1922 | Larsen | 43/17 |
| 1,777,496 A | * | 10/1930 | Killory | 43/17 |
| 1,808,736 A | * | 6/1931 | Hernke | 43/17 |
| 2,714,270 A | * | 8/1955 | Premo | 43/17 |
| 3,060,616 A | * | 10/1962 | Woodley | 43/17 |
| 3,064,244 A | * | 11/1962 | McCreary et al. | 43/17 |
| 3,364,610 A | * | 1/1968 | Poole | 43/17 |
| 3,603,017 A | * | 9/1971 | Happe | 43/17 |
| 3,878,635 A | * | 4/1975 | Trosper et al. | 43/17 |
| 3,879,880 A | * | 4/1975 | Bailey | 43/17 |
| 3,945,143 A | * | 3/1976 | Schmitt et al. | 43/17 |
| 3,992,798 A | * | 11/1976 | Schmitt, Sr. | 43/17 |
| 3,999,323 A | * | 12/1976 | Vitucci | 43/17 |
| 4,030,223 A | * | 6/1977 | Loesch et al. | 43/17 |
| 4,077,148 A | | 3/1978 | Carey | 43/16 |
| 4,154,015 A | * | 5/1979 | Holland | 43/17 |
| 4,246,716 A | * | 1/1981 | Elmer | 43/17 |
| 4,339,747 A | * | 7/1982 | Maybee | 340/547 |

(List continued on next page.)

FOREIGN PATENT DOCUMENTS

| | | | | |
|---|---|---|---|---|
| CA | 904011 | * | 7/1972 | 43/17 |
| DE | 2801625 | * | 7/1979 | |
| DE | 29722437 | * | 4/1998 | |
| EP | 850562 | * | 7/1998 | |
| FR | 2639184 | * | 5/1990 | |
| GB | 2086701 | * | 5/1982 | |
| GB | 2166331 | * | 5/1986 | |
| GB | 2175782 | * | 12/1986 | |
| GB | 2209261 | * | 5/1989 | |
| GB | 2216372 | * | 10/1989 | |
| GB | 2232863 | * | 1/1991 | |
| GB | 2240019 | * | 7/1991 | |
| GB | 2307161 | * | 5/1997 | |
| RU | 1333276 | * | 8/1987 | 43/17 |

*Primary Examiner*—Darren W. Ark
(74) *Attorney, Agent, or Firm*—Carrier, Blackman & Associates, P.C.; William D. Blackman; Joseph P. Carrier

(57) ABSTRACT

A tip-down indicator apparatus, for signaling a strike on a fishing rig, includes a casing for housing a battery, and a normally open circuit disposed within the casing for placement in electrical communication with the battery. When supplied with a battery, the normally open circuit is completable by proximity to a magnetic field. The indicator apparatus further includes an electrically powered signal generator attached to the casing and connected to the normally open circuit for signaling a completed circuit. The signal generator may be a light or a buzzer. In a preferred embodiment thereof, the indicator apparatus further includes a magnet support member connectable in pivotal relation to the casing, a magnet attached to the magnet support member, and means for drawing the magnet and the casing into proximity in response to a fish biting a hook or lure. This first embodiment may include a fishing rig including a base and a rod-reel assembly which is pivotally attachable to the base. In an alternative embodiment which is attachable to a conventional fishing rod, an apparatus includes a magnet adjacent the end of a spring arm, and an eyelet attached to the end of the spring arm near the magnet.

6 Claims, 3 Drawing Sheets

U.S. PATENT DOCUMENTS

| | | | |
|---|---|---|---|
| 4,373,287 A | * 2/1983 | Grahl | 43/17 |
| 4,384,425 A | 5/1983 | Lemons, Sr. | 43/17 |
| 4,397,113 A | 8/1983 | Pinson | 43/15 |
| 4,412,205 A | 10/1983 | Von Kemenczky | 340/331 |
| 4,638,307 A | * 1/1987 | Swartout | 340/686 |
| 4,642,930 A | * 2/1987 | Graf | 43/17 |
| 4,660,316 A | 4/1987 | Gamelin | 43/17 |
| 4,693,125 A | * 9/1987 | Krutz et al. | 43/17 |
| 4,790,099 A | 12/1988 | Miller, Jr. | 43/17 |
| 4,837,965 A | * 6/1989 | True | 43/17 |
| 4,893,027 A | * 1/1990 | Kammerer et al. | 340/551 |
| 4,905,398 A | * 3/1990 | Botbyl | 43/17 |
| 4,934,090 A | * 6/1990 | Storey et al. | 43/17 |
| 5,021,769 A | * 6/1991 | Schuellein | 340/984 |
| 5,025,583 A | 6/1991 | Langley | 43/17 |
| 5,074,072 A | * 12/1991 | Serocki et al. | 43/17 |
| 5,097,618 A | * 3/1992 | Stoffel | 43/17 |
| 5,118,196 A | 6/1992 | Ault et al. | 362/123 |
| 5,121,098 A | * 6/1992 | Chen | 340/547 |
| 5,188,447 A | 2/1993 | Chiang et al. | 362/103 |
| 5,228,228 A | 7/1993 | Meissner | 43/17 |
| 5,235,773 A | * 8/1993 | Rinehart | 43/17 |
| 5,321,391 A | * 6/1994 | Fox | 43/17 |
| 5,343,190 A | * 8/1994 | Rodgers | 340/573.1 |
| 5,448,849 A | * 9/1995 | Burgett | 43/17 |
| 5,456,478 A | 10/1995 | Hsu et al. | 280/11.22 |
| 5,555,667 A | 9/1996 | Bae et al. | 43/17 |
| 5,663,614 A | 9/1997 | Weng et al. | 315/360 |
| 5,987,801 A | * 11/1999 | Anderson | 43/17 |
| 6,079,142 A | * 6/2000 | Danser et al. | 43/17 |

* cited by examiner

MAGNETICALLY ACTUATED INDICATOR DEVICE FOR A FISHING ROD, FISHING RIG INCORPORATING THE DEVICE, AND METHOD OF USING SAME

This application claims benefit of Provisional Application Ser. No. 60/097,149 filed Aug. 19, 1998.

BACKGROUND OF THE INVENTION

1. Field of the Invention

The present invention relates to an apparatus for indicating that a fish has bitten on a fishing hook or lure. More particularly, the present invention relates to a tip-down apparatus which is magnetically actuated. The present invention also relates to a fishing rod and reel assembly incorporating the apparatus, and to a method of using the apparatus.

2. Description of the Background Art

In the practice of fishing, and particularly ice fishing, the use of tip-up indicator devices to signal the presence of a fish biting on a lure is a common practice. Many different types and designs of tip-up devices are known, including signal flags, buzzers, and some lighted devices. A few examples of tip-up devices can be found in U.S. Pat. Nos. 4,077,148, 4,660,316, 5,025,583, 5,228,228, and 5,555,667.

U.S. Pat. No. 5,555,667 discloses a signaling device for a fishing rod, which lights up when a fish attempts to take bait from a fishing line. However, the internal circuit which causes the light to be illuminated in this device is activated by a mercury switch. It is believed that it is risky to use a mercury switch in such an application, because of the possibility that mercury might somehow leak out of the device, and into the natural environment. It has been well documented that mercury is an environmental hazard which can be dangerous to humans, if inadvertently consumed. It has also been documented that where mercury is present in an aquatic environment, it has a tendency to accumulate in the fatty tissues of fish, because of their position in the food chain.

Various types of electronic switches are available for illuminating tennis shoes, in-line skates, and related applications. Examples of this type of footwear may be found in U.S. Pat. Nos. 5,188,447, 5,343,190, 5,456,478, and 5,663,614.

Proximity switches which activate in response to a magnetic field are known and used, for example, in connection with the opening of a door, to signal a business owner that an entry door has been opened. Such proximity switches are commercially available from the Radio Shack division of Tandy Corporation.

A need still exists in the art for an improved electronic signalling device, for use with a fishing rod, which is compact, efficient, and portable. Preferably, such a device would minimize any required wiring for the sake of simplicity and reliability. Further, such a device would preferably avoid the use of mercury switches.

SUMMARY OF THE INVENTION

The present invention provides an indicator apparatus for signaling a strike on a fishing rig. An indicator apparatus in accordance with the present invention, generally, includes a casing for housing a battery, a battery, and a normally open circuit disposed within the casing in electrical communication with the battery. The normally open circuit is completable by proximity to a magnetic field. The indicator apparatus further includes an electrically powered signal generator attached to the casing and connected to the normally open circuit for signaling a completed circuit. The signal generator may be a light or a buzzer.

In a preferred embodiment thereof, the indicator apparatus further includes a magnet support member connectable in pivotal relation to the casing, a magnet attached a fish biting a hook or lure.

Accordingly, it is an object of the invention to provide a method and apparatus for indicating a strike by a fish on a hook or lure.

It is a further object of the present invention to provide such a method and apparatus which avoids the inclusion of mercury therein.

It is a further object of the present invention to provide a method and apparatus which involves a magnetically activated proximity switch for indicating that a strike has occurred.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
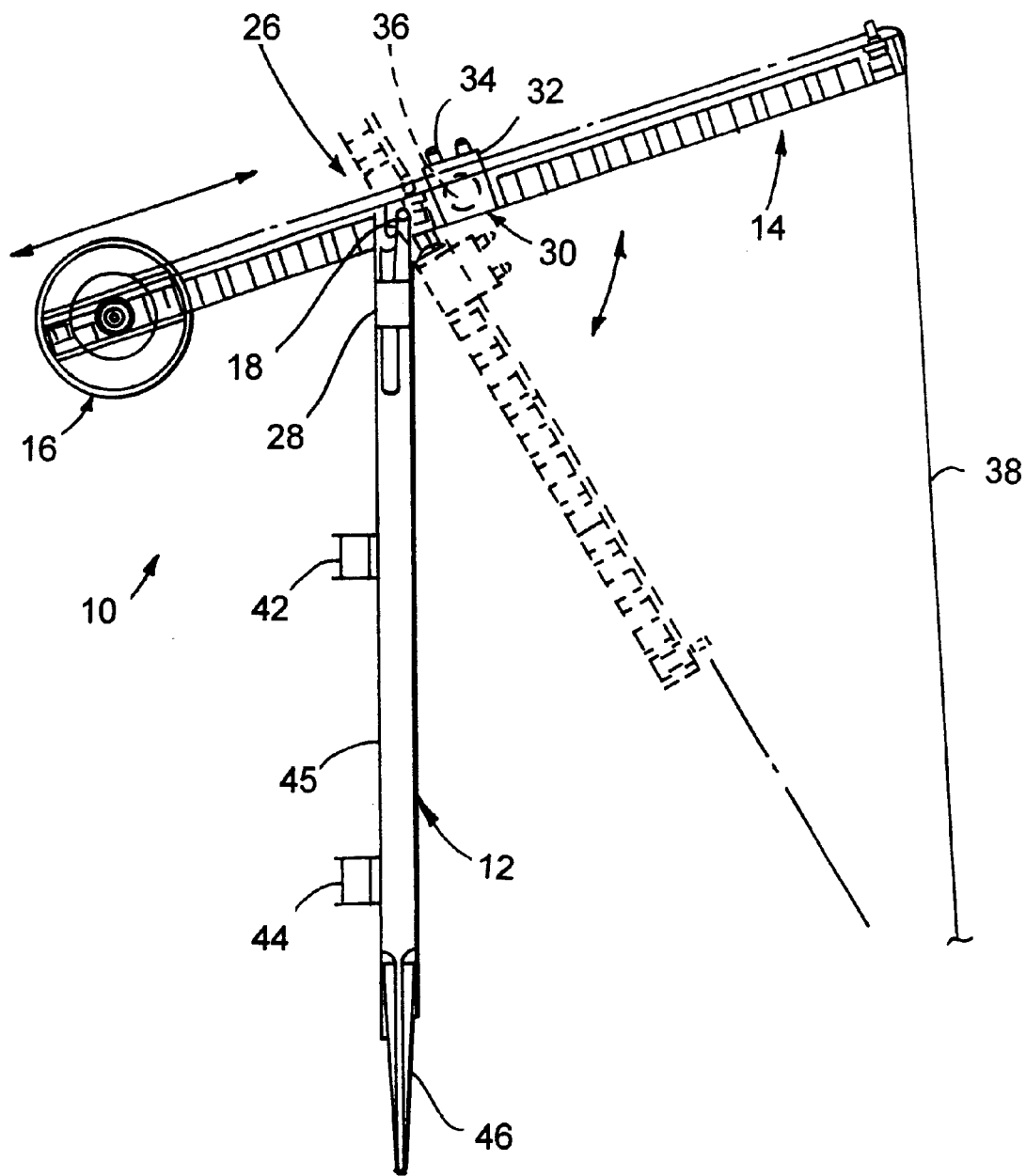
FIG. 1 is a side elevational view of a fishing rig in accordance with a first embodiment of the present invention, shown set up in an operative configuration thereof, with a first orientation of a rod thereof shown in solid lines, and a second orientation of the rod shown in phantom.

Referring now to FIG. 1, a fishing rig, in accordance with the present invention, is shown generally at 10, in an assembled configuration thereof which is useful for fishing. The fishing rig 10 includes a base 12, a rod 14, and a reel 16. In the preferred embodiment of the present invention, the base 12, the rod 14, and the reel 16 are each molded out of a durable plastic material.

The reel 16 is adjustably mounted on the rod. The reel 16 is movable laterally along the length of the rod 14, as indicated by the straight line two-headed arrow above the reel in FIG. 1, so as to function as an adjustable counterweight. Thus, the sensitivity of the tip-down action can be readily varied to accomodate the size of the target-fish, line and lure weight, wind and water conditions, and general preference of a user.

The rod 14 is pivotally and removably attachable to the base 12 by means of a pivot pin 18, which extends transversely outwardly on both sides thereof, and which fits engagingly into a pair of opposed slots 20, 22 (FIG. 2) at the top of the base 12. The base 12 further has a U-shaped opening 24 (FIG. 2) formed in the top end thereof, between the opposed slots 20, 22, to accommodate the rod 14, and to allow pivotal movement thereof with respect to the base.

The rig 10 further includes a two-part tip-down indicating device 26 in accordance with a first embodiment of the present invention. The tip-down device 26 hereof includes a magnet 28 which is housed in and attached to the base 12, and a casing member 30 which is attached to the rod 14. Preferably, the magnet 28 is a permanent magnet.

The casing member 30 includes a hollow case 32 with one or more signal emitters 34 mounted thereon. The signal emitters 34 may be light bulbs, light emitting diodes, or sound generating members such as piezoelectric buzzers. In the preferred embodiment supply power thereto. The invention requires a battery 36 to function, but may be manufactured and sold without a battery, with the expectation that a battery will be provided by the purchaser and user of the fishing rig 10.

Figure 4:
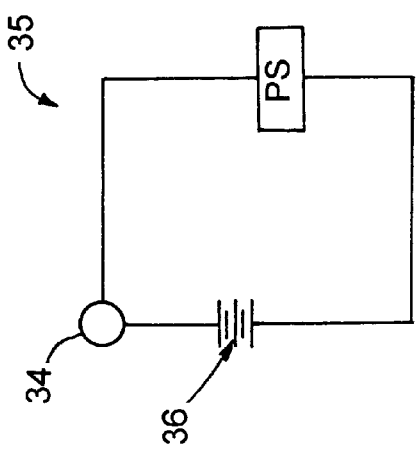
FIG. 4 is a schematic diagram of a circuit according to the invention.

The casing member also includes a normally open circuit 35 (FIG. 4) inside the case 32, for connecting the signal emitter(s) 34 to the battery 36 to generate a signal. The circuit 35 includes a proximity switch PS, which is actuatable by proximity to a magnetic field. As previously noted, proximity switches are known and are commercially available.

When a fish strikes the bait at the end of a fishing line 38, the rod 14 is pivoted downwardly to the position shown in phantom in FIG. 1, bringing the casing member 30 near the magnet 28. The magnetic field emanating from the magnet 28 acts to complete the circuit 35 inside the casing member 30, thereby activating the signal emitters 34 to alert a fisherman, or other user of the fishing rig 10, that there may be a fish on the line 38.

Figure 2:
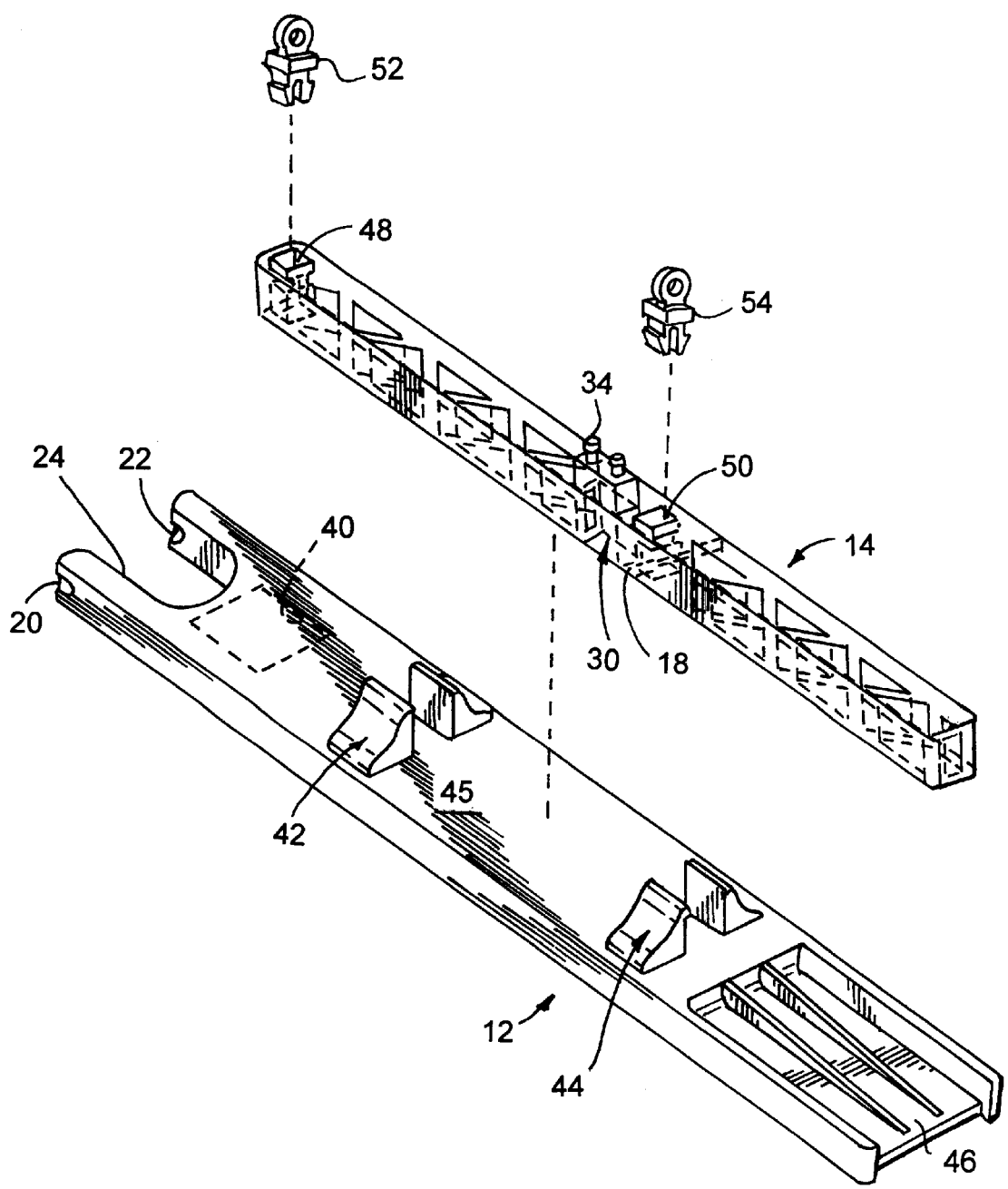
FIG. 2 is an exploded perspective view of the fishing rig of FIG. 1, shown in a stackably collapsed configuration for storage and transport thereof, with a reel omitted from the drawing for purposes of illustration.

Referring specifically to FIG. 2, the base 12 and rod 14 are shown in an exploded view of an alternate configuration thereof. The stackably collapsed configuration of the base 12 and rod 14, depicted in FIG. 2, is useful for storage and transport thereof. The reel 16 is omitted from attachment to the rod 14 in the drawing in FIG. 2, for simplicity of illustration. The base 12 includes a hollowed-out portion 40 for receiving and storing the magnet 28 therein. Optionally, the base 12 may include retaining clips 42, 44 which extend outwardly from a side surface 45 thereof, to allow for temporary and removable attachment of the rod 14 thereto. The lowermost end 46 of the base 12 may be tapered, as shown, to facilitate insertion thereof into a soil bank, snowbank, dock, or other support.

The rod 14 may have a number of hollow recesses such as those shown at 48, 50 formed therein to receive eyelet members 52, 54 for use in guiding the path of fishing line 38 therealong.

Figure 3:
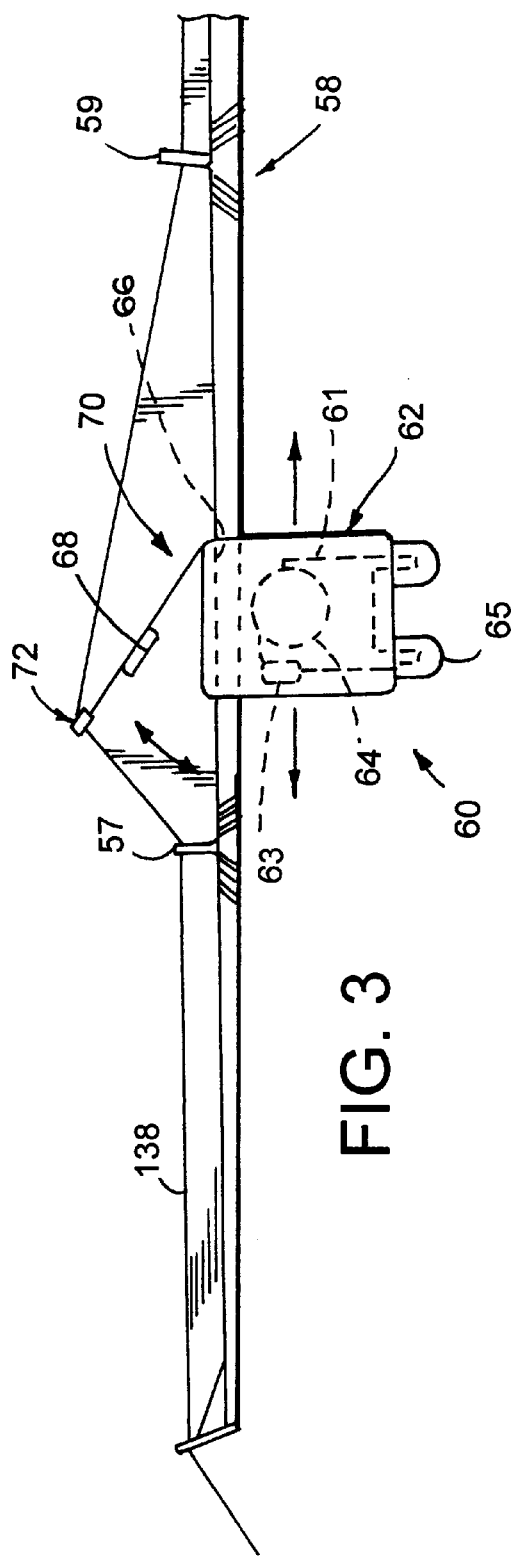
FIG. 3 is a side plan view, partially cut away, of a fishing rod incorporating a second embodiment of the present invention.

Referring now to FIG. 3, a second embodiment of a magnetically actuated tip-down The rod 14 may have a number of hollow recesses such as those shown at 48, 50 formed therein to receive eyelet members 52, 54 for use in guiding the path of fishing line 38 therealong.

Referring now to FIG. 3, a second embodiment of a magnetically actuated tip-down indicator device is shown at 60 for attachment to a conventional fishing rod 58. The indicator device 60, in this embodiment, is a self-contained unit which is adjustably attachable to a rod 58, as indicated by the opposed arrows on either side of the indicator device 60 in FIG. 3.

In this embodiment, the indicator device 60 includes a hollow casing 62 which houses a battery 64 and a normally open proximity circuit 61. The circuit 61 includes a magnetically actuated proximity switch 63, the battery 64, and one or more signaling members 65, connected in series. The proximity switch 63 does not allow current to flow therethrough unless and until it is placed into a magnetic field. The signaling members 65 in this embodiment 60 may also be light emitting diodes, light bulbs, or piezoelectric buzzers, as well as combinations thereof, such as a light and a buzzer. As noted, the proximity circuit 61 in the casing 62 is activatable by exposure to a magnetic field. The casing also has a hollow passage 66 formed therethrough, to receive a portion of a rod 58 therein to allow mounting of the device 60 thereon.

The indicator device 60 also includes a permanent magnet 68 attached to the casing 62 by a spring arm 70. The spring arm 70 also has a toroidal eyelet 72 affixed to an end thereof which is farthest from the casing 62. When fishing line 138 is threaded on to the rod 58, it is routed through the eyelet 72 of the indicator device 60, as well as through the normal eyelets 57, 59 on the rod.

The magnet 68 is normally disposed at a sufficient distance from the casing, by its position on the outer part of the spring arm, to allow the circuit 61 in the casing to remain open, without any current flowing therethrough.

However, at such time as a fish should take hold of a lure or other bait attached to the fishing line 138 and place the line under tension, that tension will be applied to the eyelet 72 at the end of the spring arm 70, and will pull the spring arm, with its attached magnet 68, towards the rod 58, as indicated by the bottom half of the two-headed arrow in FIG. 3. When the magnet moves closer to the casing 62, it acts to complete the circuit 61 inside the casing and to activate the signaling members 65. Conversely, when tension on the fishing line 138 is released, the spring arm 70 will once again move the magnet 68 far enough from the casing 62 to open the circuit 61.

As an alternative to the use of the proximity switch, the device according to this embodiment could use a tension activated switch, somewhat similar to the switch used in the 'light-up' type of tennis shoes, with the switch connected to the spring arm 70 to complete the circuit when a certain level of tension is sensed thereon.

Although the present invention has been described herein with respect to a preferred embodiment thereof, the foregoing description is intended to be illustrative, and not restrictive. Those skilled in the art will realize that many modifications of the preferred embodiment could be made which would be operable. As one example of a possible modification, the casing 30, with its attached signal emitters 34, in the fishing rig 10 of the first embodiment could be attached to the base 12 where the magnet 28 is shown in FIGS. 1 and 2 of the drawings, instead of to the rod 14, and correspondingly, the magnet 28 could then be attached to the rod 14 where the casing 30 is shown in FIGS. 1 and 2. All such modifications which are within the scope of the claims are intended to be within the scope and spirit of the present invention.

I claim:

1. An indicator apparatus for use in conjunction with a battery to signal a strike on a fishing rig, comprising:
   a casing for housing said battery;
   a normally open circuit disposed within said casing for placement in electrical communication with said battery, said normally open circuit comprising a proximity switch and being completable, when supplied with said battery, by proximity to a magnetic field;

signal means attached to said casing and connected to said circuit for signaling a completed circuit; and a magnet connectable to said casing in a manner such that one of the group consisting of said magnet and said casing is reciprocally and alternately movable a limited distance, in opposite directions, toward and away from the other of said group.

2. The indicator apparatus of claim 1, further comprising:

a magnet support member connectable in pivotal relation to said casing; said magnet being attached to said magnet support member;

and wherein said magnet and said casing are drawn into proximity to one another in response to tension on a fishing line.

3. The apparatus of claim 2, wherein said magnet support member comprises a flexibly movable spring arm which interconnects said magnet and said casing.

4. A fishing rig for use in conjunction with a battery, comprising:

a rod having eyelets thereon to receive and guide fishing line;

a reel which is attached to said rod;

a base member for affixing to a support, said rod being pivotally attachable to said base member; and an indicator apparatus for signaling a strike on said fishing rig, comprising:

a casing for housing said battery;

a normally open circuit disposed within said casing for placement in electrical communication with said battery, said normally open circuit being completable by proximity to a magnetic field;

signal means attached to said casing and connected to said circuit for signaling a completed circuit;

a magnet for activating said indicator apparatus;

wherein one component selected from the group consisting of said casing and said magnet is attached to said rod, and the other component of said group is attached to said base member.

5. The fishing rig of claim 4, wherein said reel is longitudinally adjustable along said rod according to the wishes of a user, to act as a counterweight so as to vary the sensitivity to movement of an end of the rod opposite said reel.

6. The fishing rig of claim 4, wherein said base member has a plurality of retaining clips thereon, and said rod is detachable from a pivotal relation to said base member, and may be stackably clipped thereon for storage or transport.

* * * * *